United States Patent
Wakade (12)

(10) Patent No.: US 8,133,329 B2
(45) Date of Patent: Mar. 13, 2012

(54) SELECTIVE SINTERING OF COMPACTED COMPONENTS

(75) Inventor: Shekhar G. Wakade, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 627 days.

(21) Appl. No.: 12/144,746

(22) Filed: Jun. 24, 2008

(65) Prior Publication Data

US 2009/0317279 A1 Dec. 24, 2009

(51) Int. Cl.
*H01F 1/22* (2006.01)
*B22F 3/087* (2006.01)
*B22F 3/12* (2006.01)

(52) U.S. Cl. ............ 148/104; 148/103; 419/1; 419/38; 419/66

(58) Field of Classification Search ................. None
See application file for complete search history.

(56) References Cited

U.S. PATENT DOCUMENTS

| | | | |
|---|---|---|---|
| 5,405,574 A | 4/1995 | Chelluri et al. | |
| 5,611,139 A | 3/1997 | Chelluri et al. | |
| 5,611,230 A | 3/1997 | Chelluri et al. | |
| 5,689,797 A | 11/1997 | Chelluri et al. | |
| 2005/0001499 A1 | 1/2005 | Calico | |
| 2006/0162967 A1* | 7/2006 | Brackin et al. | 175/374 |
| 2010/0270430 A1* | 10/2010 | Koehler et al. | 244/121 |

* cited by examiner

*Primary Examiner* — John Sheehan

(57) ABSTRACT

One embodiment includes compacting a powder material using at least a first magnetic field to form a compact and selectively sintering a first portion of the compact and leaving a second portion of the compact unsintered to form a component.

17 Claims, 1 Drawing Sheet

SELECTIVE SINTERING OF COMPACTED COMPONENTS

TECHNICAL FIELD

The field to which the disclosure generally relates includes selective sintering of compacted components.

BACKGROUND

The powder metallurgical process known as "press and sinter" involves compressing metal powder to obtain a component of the desired shape. The whole component is then placed in a furnace at a sintering temperature below the melting temperature of the metal. The powder particles join or fuse during sintering. The furnace sintering operation may be necessary for the components produced by conventional methods to be useful in any engineering application because the green (unsintered) density of the components is low enough that they can break with little or no force, or due to mishandling. In the conventional method, the component is machined after the whole component is sintered. The double press and sinter technique, as opposed to the single press and sinter technique, involves compacting (pressing) the metal powder to produce a green compact, presintering the green compact at a temperature below the final sintering temperature, repressing, and sintering. The double press technique can achieve a slightly higher density than the single press technique.

The dynamic magnetic compaction (DMC) technique can produce components with higher green density and higher performance than those produced by conventional press and sinter techniques. The DMC method applies pressures generated by non-contact electromagnetic forces to compact powder-like and/or particulate materials into high density bodies.

SUMMARY OF EXEMPLARY EMBODIMENTS OF THE INVENTION

One embodiment includes compacting a powder material using at least a first magnetic field to form a compact and selectively sintering a first portion of the compact and leaving a second portion of the compact unsintered to form a component.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

Figure 1:
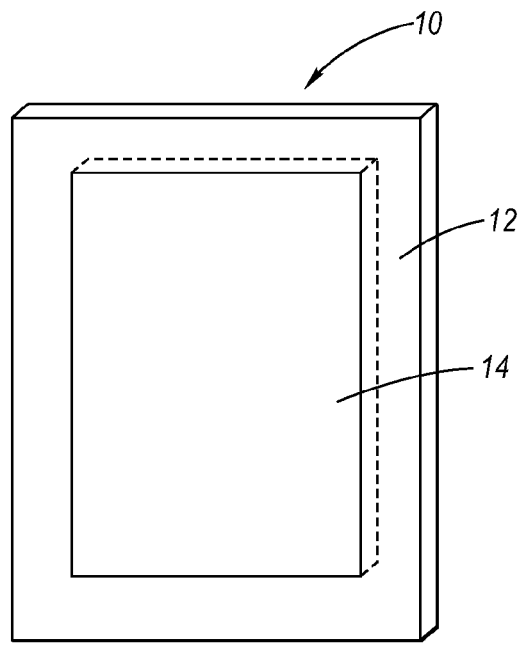
FIG. 1 illustrates a product according to one embodiment.
Figure 2:
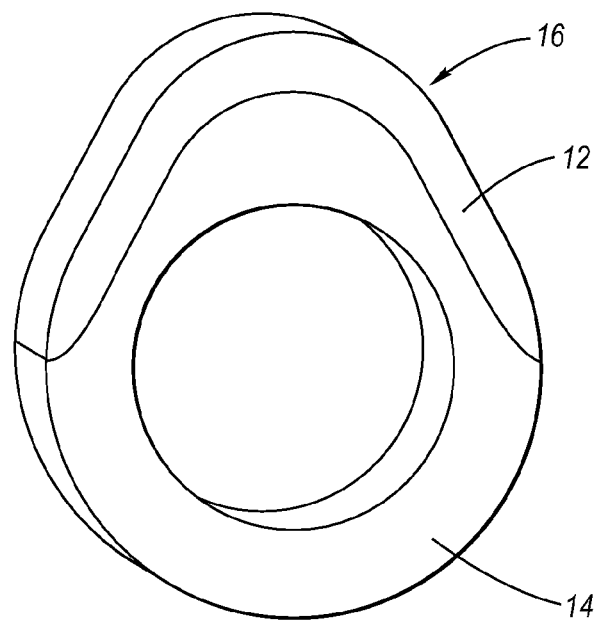
FIG. 2 illustrates a product according to one embodiment.

The following description of the embodiment(s) is merely exemplary (illustrative) in nature and is in no way intended to limit the invention, its application, or uses. According to one embodiment, a component is produced using a method of compacting a powder-like and/or particulate material to form a green compact of any suitable shape and size, followed by selective sintering of areas of the compact that need to be strengthened and optional quenching to harden the selectively sintered regions of the component. The compacting of a powder-like and/or particulate material may be used to produce a variety of products including, but not limited to, rods and gears. Referring to FIG. 1, a component 10 produced by the method of one embodiment has a sintered portion 12 and an unsintered portion 14. In one embodiment, the sintered portion 12 may be sinter hardened. The method of producing the component 10 according to one embodiment may reduce manufacturing costs for the component while maintaining sufficient strength of the component for its desired application. As shown in FIG. 2, in one embodiment the component 10 may be a camshaft lobe 16 with the sintered portion 12 and the unsintered portion 14.

The powder-like and/or particulate material may be, for example but not limited to, metals, metal alloys, metal compounds, ceramic compounds, and ceramic and metal composites. In one embodiment the powder material may be ferrous. The compacting of the powder-like and/or particulate material may be accomplished using a magnetic field. In one exemplary embodiment, the compacting may be accomplished using a dynamic magnetic compaction (DMC) process. The DMC process uses electromagnetic forming of one or more substrates or containers overlying or holding the powder-like and/or particulate material. In one exemplary embodiment, a magnetic field generating component is provided. The powder-like and/or particulate material may be placed in an electrically conductive container or sleeve. The container may include an electrically conductive material such as, but not limited to, copper, silver, aluminum, stainless steel and alloys thereof. The magnetic field generating component may be operated to produce a first magnetic field.

In one embodiment, the magnetic field generating component, for example, but not limited to, an electrically conductive coil, may be positioned to surround the electrically conductive container. In one embodiment, an electrical supply source separate from the container may provide electrical energy to the electrically conductive coil in the form of a rapid current pulse. The first magnetic field may be produced when the electrical current is passed through the electrically conductive coil.

The magnetic field generating component and the container including the powder-like and/or particulate material may be constructed and arranged so that the first magnetic field induces a current in the container and so that the induced current produces a second magnetic field. The first magnetic field and the second magnetic field are of such magnitude and direction that they repel each other and so that the container is compressed. As the container is being compressed, a wall of the container applies pressure on the powder-like and/or particulate material, compacting the same. In one embodiment, a die may be positioned inside the container and the powder-like and/or particulate material may be placed in the container so as to surround the die to form various features of the compact as the container is being compressed.

This compaction may create a dense body of material. This dense body may be known as the green (unsintered) compact. The dynamic magnetic compaction method results in a stronger green compact with a higher uniform density than one produced by conventional powder metallurgical processes. For example, the DMC process typically produces a green compact having a density in excess of 90% of theoretical density, where theoretical density is defined as the density of a material containing no porosity or imperfections of any kind. However, the density of green compacts formed by the DMC process is more commonly about 95% of theoretical density. In another embodiment, the density of green compacts formed by the DMC process may be in excess of 95% of theoretical density. In one embodiment, the green compact may then be machined as desired, as it has sufficient strength in the green state to maintain its shape. Machining the compact in the green state before sintering may save substantial energy and tooling costs.

In one exemplary embodiment, the magnetic generating component may be a coil and the container may be placed in the coil so that at least a portion of the container with the powder-like and/or particulate material is received within the coil. The container may be of a configuration such that a component of the desired shape is produced when the container is compressed. For example, if the component to be produced is a cylindrical rod, the container may be in the shape of a cylinder. In one embodiment, the resulting compacted component of the powder and/or particulate material is produced by the process and then the container may be removed, for example, by applying a load on the container wall such that it slides off of the compacted component. Thereafter, if desired, all or portions of the compacted component of powder or particulate material may be machined.

Following the optional machining, the compact is then selectively sintered to form the component 10. Selective sintering may save energy costs and manufacturing time. In one embodiment, selective sintering may be accomplished by subjecting a desired region of the component to any suitable heating source capable of providing sufficient heat energy at the desired regions of the compact in the presence of an appropriate atmosphere so that any oxidation of the surface layers is prevented. The duration of heating as well as the amount of input heat energy which is applied depends upon the section of the component that needs to be further strengthened through sintering. The sintering process may enhance the mechanical properties of the compact due to the diffusional bonding of the particles to one another. Referring to FIG. 1, the sintered portion 12 of the component 10 may have a higher density than the unsintered portion 14. In one embodiment, only the areas of the compact that need to be strengthened to withstand a higher loading requirement on that area are selectively sintered. For example, referring to FIG. 2, the sintered portion 12 of the camshaft lobe may have a higher strength requirement than the unsintered portion 14 due to its function in an engine. The sintered portion 12 may include any desired portion of the component 10. The sintered portion 12 and the unsintered portion 14 may have any suitable geometries. The sintered portion 12 may include a cohesive body including a plurality of particles having adjacent surfaces bonded or fused together.

According to one embodiment, the compact 10 is selectively sintered using induction heating. To achieve induction heating, the compact is placed inside an induction coil. AC current is sent through the induction coil and the resulting magnetic field induces eddy currents, which generate localized heat.

In another embodiment, the compact 10 is selectively sintered using laser hardening (laser heat treatment). The laser can be precisely controlled to heat treat a specific area without affecting the remainder of the component. The laser quickly raises the temperature of the target material. In one embodiment, self-quenching by the surrounding area may result in the hardening of the target material. Whether induction heating or laser heating is used, in both cases a protective atmosphere may be provided around the work piece to prevent undesirable changes in the surface chemistry or microstructure of the compact.

In one embodiment, the selective sintering operation may be followed up by a quenching operation, thus accomplishing single step selective sinter hardening. Referring to FIGS. 1-2, the first portion 12 may be both sintered and hardened. For a suitable ferrous component having suitable chemistry, the heating operation immediately followed by a quenching operation accomplishes both sintering and hardening of the first portion 12 in one step. In one embodiment, the quenching immediately follows the induction heating or laser hardening in a manner known in the art, for example but not limited to, the use of quench rings on induction heating equipment. Quenching may result in phase transformation and increased hardness of the first portion 12 of the component.

The above description of embodiments of the invention is merely exemplary in nature and, thus, variations thereof are not to be regarded as a departure from the spirit and scope of the invention.

What is claimed is:

1. A method comprising:
   compacting a powder material comprising compressing the powder material by subjecting the powder material to at least a first magnetic field to form a compact; and
   selectively sintering a first portion of the compact and leaving a second portion of the compact unsintered to form a component.

2. A method as set forth in claim 1 further comprising: machining the compact prior to selective sintering.

3. A method as set forth in claim 1 wherein the powder material is ferrous and further comprising quenching the component immediately after selectively sintering.

4. A method as set forth in claim 1 wherein the selective sintering comprises induction heating.

5. A method as set forth in claim 1 wherein the selective sintering comprises laser hardening.

6. A method as set forth in claim 1 wherein the powder material is electrically conductive.

7. A method as set forth in claim 1 wherein the powder material comprises one of a metal, metal alloy, metal compound, ceramic compound, or ceramic and metal composite.

8. A method as set forth in claim 1 wherein the compacting the powder material using at least the first magnetic field comprises providing an electrically conductive container and placing the powder material in the container and wherein the first magnetic field induces a current in the container producing a second magnetic field so that the first and second magnetic fields repel each other and the container is compressed to compact the powder material to provide a compact, and thereafter selectively sintering a first portion of the compact and leaving a second portion of the compact unsintered to form a component comprising a first sintered portion and a second unsintered portion.

9. A method as set forth in claim 8 wherein the first magnetic field is generated using a coil.

10. A method as set forth in claim 8 wherein the particulate material is ferrous and further comprising quenching the component immediately following the selective sintering to harden the first portion of the component.

11. A method as set forth in claim 8 further comprising machining the compact prior to selective sintering.

12. A method as set forth in claim 8 wherein the selective sintering comprises induction heating.

13. A method as set forth in claim 8 wherein the selective sintering comprises laser hardening.

14. A method as set forth in claim 8 wherein the particulate material is electrically conductive.

15. A method as set forth in claim 8 wherein the particulate material comprises one of a metal, metal alloy, metal compound, ceramic compound, or ceramic and metal composite.

16. A method comprising:
   providing a powder material and a substrate overlying the powder material;
   subjecting the powder material and the substrate to an electromagnetic field to compress the substrate to compact the powder material into a compact; and
   selectively sintering a first portion of the compact and leaving a second portion of the compact unsintered to form a component.

17. A method comprising:
   compacting a powder material using at least a first magnetic field to form a compact comprising providing an electrically conductive container and placing the powder material in the container and wherein the first magnetic field induces a current in the container producing a second magnetic field so that the first and second magnetic fields repel each other and the container is compressed to compact the powder material to provide a compact, and thereafter selectively sintering a first portion of the compact and leaving a second portion of the compact unsintered to form a component comprising a first sintered portion and a second unsintered portion.

* * * * *